(12) United States Patent
Hande et al.

(10) Patent No.: US 9,524,527 B2
(45) Date of Patent: Dec. 20, 2016

(54) SEED GROUP SELECTION IN A PROBABILISTIC NETWORK TO INCREASE CONTENT DISSEMINATION

(71) Applicant: Adobe Systems Incorporated, San Jose, CA (US)

(72) Inventors: Sayaji Hande, Ghaziabad (IN); Ritwik Sinha, Calcutta (IN); Vineet Gupta, Kanpur (IN); Sandeep Zechariah George, Kadavanthra Kochi (IN)

(73) Assignee: Adobe Systems Incorporated, San Jose, CA (US)

( * ) Notice: Subject to any disclaimer, the term of this patent is extended or adjusted under 35 U.S.C. 154(b) by 499 days.

(21) Appl. No.: 13/916,775

(22) Filed: Jun. 13, 2013

(65) Prior Publication Data

US 2014/0372523 A1     Dec. 18, 2014

(51) Int. Cl.
*G06Q 30/02* (2012.01)
*G06Q 50/00* (2012.01)

(52) U.S. Cl.
CPC .......... *G06Q 50/01* (2013.01); *G06Q 30/0241* (2013.01); *G06Q 30/0251* (2013.01)

(58) Field of Classification Search
CPC .... G06Q 50/01–50/02; G06Q 30/02–30/0241; G09B 7/07; H04W 16/14
See application file for complete search history.

(56) References Cited

U.S. PATENT DOCUMENTS

| | | | | |
|---|---|---|---|---|
| 2003/0028469 A1* | 2/2003 | Bergman | .............. | G06Q 30/06 705/37 |
| 2005/0075922 A1* | 4/2005 | Brady | .................... | G06Q 30/02 705/7.32 |
| 2006/0286531 A1* | 12/2006 | Beamish | .................. | G09B 7/07 434/323 |
| 2008/0070209 A1* | 3/2008 | Zhuang | .................. | G06Q 30/02 434/236 |
| 2009/0328106 A1* | 12/2009 | Levitan | .................. | H04H 60/46 725/46 |
| 2010/0329180 A1* | 12/2010 | Rao | ........................ | H04W 16/14 370/328 |

(Continued)

OTHER PUBLICATIONS

Ilyas et al "A KLT-inspired Node Centrality for Identifying Influential Neighborhoods in Graphs" published by IEEE in 2010.*

*Primary Examiner* — Wing F Chan
*Assistant Examiner* — Raji Krishnan
(74) *Attorney, Agent, or Firm* — Wolfe-SBMC

(57) ABSTRACT

Determined seed groups herein improve content dissemination across a communication network connecting a plurality of users. Probabilities of each user in the plurality influencing remaining users in the plurality to observe the content are identified to select a first influential user from the plurality. The seed group size is established and a user of the plurality with a probability proximate to the probability of the first influential user is identified. Based on the seed group size, the probabilities of the remaining users in the plurality are unified with the probability of the first influential user to determine new probabilities of the remaining users, and another user of the plurality with a probability proximate to the probability of the first influential user is identified. The method then provides for selecting the users identified as having probabilities proximate to the probability of the first influential user to establish the seed group.

20 Claims, 12 Drawing Sheets

(56) References Cited

U.S. PATENT DOCUMENTS

| | | | |
|---|---|---|---|
| 2011/0276508 A1* | 11/2011 | Varadarajan | G06Q 50/205 705/326 |
| 2011/0295626 A1* | 12/2011 | Chen | G06Q 30/02 705/7.11 |
| 2013/0124448 A1* | 5/2013 | Soulie-Fogelman | G06Q 50/01 706/52 |
| 2013/0304726 A1* | 11/2013 | Sandulescu | G06F 17/30864 707/722 |
| 2014/0089400 A1* | 3/2014 | Yan | G06Q 50/01 709/204 |
| 2014/0095689 A1* | 4/2014 | Borgs | G06Q 50/01 709/224 |
| 2014/0122473 A1* | 5/2014 | Fletcher | G06Q 10/101 707/732 |
| 2014/0337356 A1* | 11/2014 | Barbieri | G06Q 50/01 707/748 |
| 2015/0134402 A1* | 5/2015 | Barbieri | G06Q 30/0201 705/7.29 |
| 2015/0254692 A1* | 9/2015 | Xu | G06Q 30/02 705/7.33 |

\* cited by examiner $$P = \begin{bmatrix} 1 & p_{12} & p_{13} & p_{14} & p_{15} \\ p_{21} & 1 & p_{23} & p_{24} & p_{25} \\ p_{31} & p_{32} & 1 & p_{34} & p_{35} \\ p_{41} & p_{42} & p_{43} & 1 & p_{45} \\ p_{51} & p_{52} & p_{53} & p_{54} & 1 \end{bmatrix}$$

$i^{th}$ user probability of influencing others (rows); $j^{th}$ user probability of being influenced (columns); Influence Matrix $P$

FIG. 5

$$P = \begin{bmatrix} 1 & p_{12} & \boxed{p_{13}} & p_{14} & p_{15} \\ p_{21} & 1 & \boxed{p_{23}} & p_{24} & p_{25} \\ p_{31} & p_{32} & \boxed{1} & p_{34} & p_{35} \\ p_{41} & p_{42} & \boxed{p_{43}} & 1 & p_{45} \\ p_{51} & p_{52} & \boxed{p_{53}} & p_{54} & 1 \end{bmatrix}$$

$i^{th}$ user probability of influencing others (rows); $j^{th}$ user probability of being influenced (columns); Influence Matrix $P$

FIG. 6

$$\begin{bmatrix} 1 & p_{12} & 1 & p_{14} & p_{15} \\ p_{21} & 1 & 1 & p_{24} & p_{25} \\ p_{31} & p_{32} & 1 & p_{34} & p_{35} \\ p_{41} & p_{42} & 1 & 1 & p_{45} \\ p_{51} & p_{52} & 1 & p_{54} & 1 \end{bmatrix}$$

$j^{th}$ user probability of being influenced $i^{th}$ user probability of influencing others Influence Matrix $P$

FIG. 7

$$P = \begin{bmatrix} 1 & p_{12} & 1 & p_{14} & \boxed{p_{15}} \\ p_{21} & 1 & 1 & p_{24} & \boxed{p_{25}} \\ p_{31} & p_{32} & 1 & p_{34} & \boxed{p_{35}} \\ p_{41} & p_{42} & 1 & 1 & \boxed{p_{45}} \\ p_{51} & p_{52} & 1 & p_{54} & \boxed{1} \end{bmatrix}$$

$j^{th}$ user probability of being influenced $i^{th}$ user probability of influencing others Influence Matrix $P$

FIG. 8

$$P = \begin{bmatrix} 1 & p_{12} & 1 & p_{14} & \boxed{1} \\ p_{21} & 1 & 1 & p_{24} & \boxed{1} \\ p_{31} & p_{32} & 1 & p_{34} & \boxed{1} \\ p_{41} & p_{42} & 1 & 1 & \boxed{1} \\ p_{51} & p_{52} & 1 & p_{54} & \boxed{1} \end{bmatrix}$$

$j^{th}$ user probability of being influenced $i^{th}$ user probability of influencing others Influence Matrix $P$

FIG. 9

$$P = \begin{bmatrix} 1 & p_{12} & p_{13} & p_{14} & 1 \\ p_{21} & 1 & p_{23} & p_{24} & 1 \\ p_{31} & p_{32} & 1 & p_{34} & 1 \\ p_{41} & p_{42} & p_{43} & 1 & 1 \\ p_{51} & p_{52} & p_{53} & p_{54} & 1 \end{bmatrix}$$

$j^{th}$ user probability of being influenced (columns); $i^{th}$ user probability of influencing others (rows); Influence Matrix $P$

FIG. 11

$$P = \begin{bmatrix} 1 & p_{12} & p_{13} & \boxed{p_{14}} & 1 \\ p_{21} & 1 & p_{23} & \boxed{p_{24}} & 1 \\ p_{31} & p_{32} & 1 & \boxed{p_{34}} & 1 \\ p_{41} & p_{42} & p_{43} & \boxed{1} & 1 \\ p_{51} & p_{52} & p_{53} & \boxed{p_{54}} & 1 \end{bmatrix}$$

$j^{th}$ user probability of being influenced (columns); $i^{th}$ user probability of influencing others (rows); Influence Matrix $P$

FIG. 12

$$\begin{array}{c} \text{$j^{th}$ user probability of} \\ \text{being influenced} \end{array}$$

$$\text{$i^{th}$ user probability of influencing others} \begin{bmatrix} 1 & p_{12} & p_{13} & 1 & p_{15} \\ p_{21} & 1 & p_{23} & 1 & p_{25} \\ p_{31} & p_{32} & 1 & 1 & p_{35} \\ p_{41} & p_{42} & p_{43} & 1 & p_{45} \\ p_{51} & p_{52} & p_{53} & 1 & 1 \end{bmatrix} \text{Influence Matrix } P$$

*FIG. 14*

SEED GROUP SELECTION IN A PROBABILISTIC NETWORK TO INCREASE CONTENT DISSEMINATION

FIELD OF THE INVENTION

The invention generally relates to the field of selecting a seed group of users to improve content dissemination across a network of users.

BACKGROUND

Viral marketing is a technique by which social networks are used to increase brand recognition. Content is described as "going viral" when it is disseminated in a cascading fashion. Generally, the viral growth, or "virality", of content observations occurs when people convince or encourage others to observe (e.g., engage with) the content, and they in turn influence others to observe the content, and so on. For example, one person may have a particular level of influence over a group of people based on a variety of factors, such as personality, popularity, fame, and wealth. Once this relatively influential person observes some form of content, that person may influence others to observe the same content. In turn, those influenced may also influence others to observe the content based on their respective levels of influence, quickly escalating the number of times the content is observed.

Designing a campaign to propagate content virally is advantageous but exceptionally difficult. Thus, advertisers view viral marketing campaigns as risky ventures. An advertiser would find it appealing if it could design a "content spread strategy" that will likely maximize observances of the content. For example, if the advertiser could select a group of individuals to target for a commercial advertisement and determine who would propagate it to the largest number of people, the advertiser could assign a monetary value to the commercial advertisement. But, designing a system with such a large number of people can be complicated because of the varying levels of influence among the people observing the content. Selection algorithms exist but they are exceptionally complex and difficult to implement.

SUMMARY

Systems and methods presented herein provide for selection of a seed group of k individuals of a relatively large group to increase the number of observances of content (e.g., video, audio, and/or textual content) by the larger group. For example, the various embodiments herein may be operable to increase the spread of the content by users connected on some network, such as the Internet. The process generally assumes a known "influence matrix" with each element of the matrix indicating the influence of an $i^{th}$ user on a $j^{th}$ user in the matrix to observe the content. These initial seed group individuals, or "users", can influence other users with respective probabilities in subsequent connections. Those who get influenced can further influence their connections and thus increase dissemination of the content.

In one embodiment, a method is provided for determining a seed group from a plurality of users. The seed group is used to improve dissemination of content across a communication network (e.g., the internet, television networks, and the like) connecting the users when the seed group is presented with the content. The method includes predicting an influence of a user disseminating the content to the plurality of users, iteratively adding the user to the seed group if the influence of the user exceeds a threshold, and, if the user is added to the seed group, adjusting probabilities of other users of the plurality of users disseminating the content to the user in order to adjust influence of the other users.

For example, each user generally has a probability of influencing others in the plurality of users to observe the content. A first user may be deemed to have the highest probability and may be used to form the basis for selecting subsequent users to add to the seed group. In an iterative process, a user may be selected to be part of the seed group if the user has a probability that is closest to that of the first user. Once that user is added to the seed group, the probabilities of the other users are adjusted in the context of the other users being able to influence the selected user so as to reorder the influence of the other users.

The established seed group can be improved through another iterative process. For example, for a predetermined number of times and starting with a first user added to the seed group, the method may iteratively change the adjusted probabilities of the other users to their original values to reorder influence of the plurality of users, and then add another user to the seed group if the influence of said another user exceeds the threshold. Such generally results in users of lesser influence being removed from the seed group during the seed group improvement process.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

FIGS. 5-14 illustrate exemplary probability matrices for determining a seed group.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
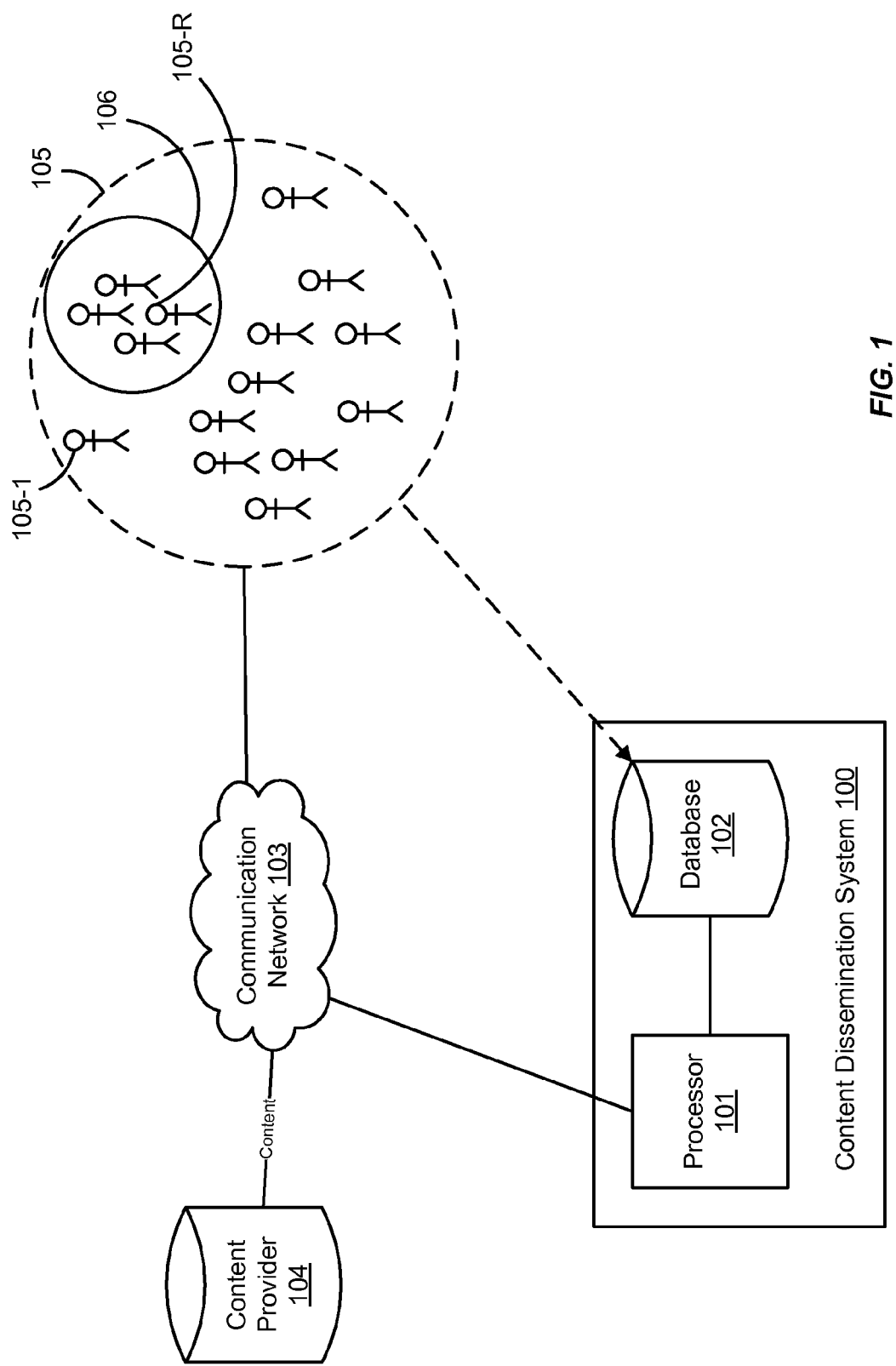
FIG. 1 is a block diagram of an exemplary content dissemination system for selecting a seed group from a plurality of users that increases dissemination of content across a communication network connecting the users.

FIG. 1 is a block diagram of an exemplary content dissemination system 100 for selecting a seed group from a plurality of users 105 that increases dissemination of content across a communication network 103 connecting the users 105. For example, the content provider 104 may wish to target the content to specific a demographic of the users 105. The content provider 104 may wish to maximize the dissemination of the content to the targeted demographic. The content dissemination system 100, based on the demographic information, may select a most influential user 105-1 and then generate a seed group 106 from remaining users 105 that will likely increase or maximize dissemination of the content to the remaining users 105 in that demographic. Generally, the content dissemination system 100 forms the seed group 106 based on the user 105-1 (e.g., the most influential user 105). Once the seed group 106 is established, the content dissemination system 100 provides the seed group information to the content provider 104 for initial dissemination of the content to the seed group 106, potentially maximizing the number of users to view the content and increasing the market value of the content.

The content provider 104 provides the content to the users 105 via the communication network 103. One example of the communication network 103 is the Internet, although the network 103 may be any network capable of providing probabilistic propagation of the content, such as television and radio networks. The content to be observed can be any form of content including textual content, audio content, and/or video content (e.g., streaming Internet videos and websites).

The content dissemination system 100 includes a database 102 of demographic information of the users 105 that may observe the content via the communication network 103. Some examples of demographic information may include residential address, age, sex, race, and the like. The database may also include relative probabilities of the users 105 influencing the remaining users of the plurality (e.g., categorized according to certain demographics). For example, the database 102 may include a probability of the user 105-1 influencing the users 105-2-105-R (where "R" represents an integer much greater than one), a probability of the user 105-2 influencing the users 105-1 and 105-3-105-R, a probability of the user 105-3 influencing the users 105-1-105-2 and 105-4-105-R, and so on. The database 102 is any system, device, software, or combination thereof operable to store the demographic information and probabilities of the users 105.

The content dissemination system 100 also includes a processor 101 that is operable to establish the seed group 106 from the users 105 based on the demographic information and probabilities in the database 102. The processor 101 is any system, device, software, or combination thereof operable to establish the seed group 106. One embodiment of the operability of the content dissemination system 100 is generally discussed with respect to the flowchart of FIG. 2.

Figure 2:
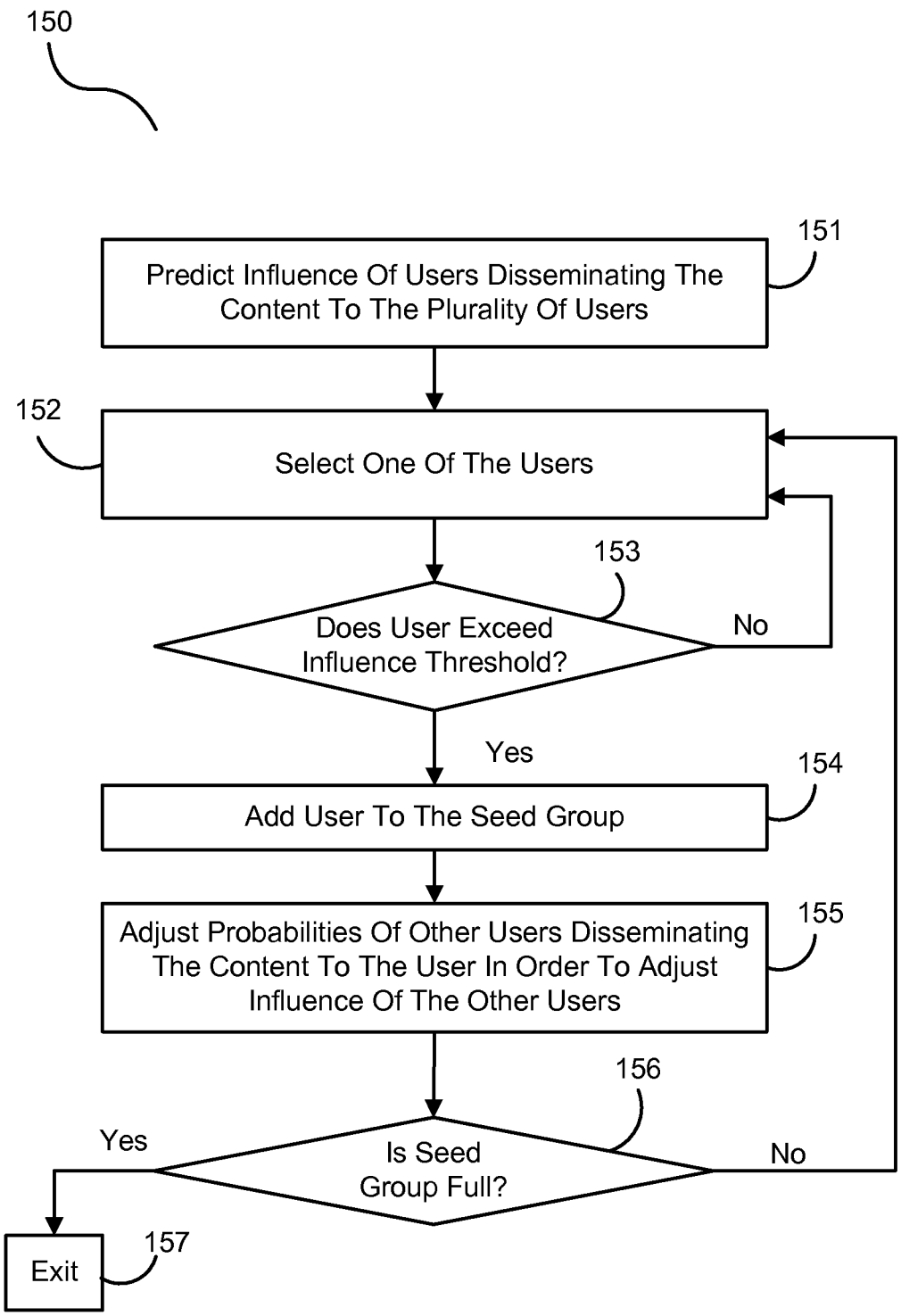
FIG. 2 is a flowchart of an exemplary process of the system of FIG. 1.

FIG. 2 is a flowchart of one exemplary process 150 operable with the content dissemination system 100. In this embodiment, the influences of the users 105 disseminating the content are predicted, in the process element 151. For example, each user may have a probability of influencing another user within the plurality of users 105 to observe the content. This information, being stored in the database 102, may be used by the processor 101 to predict the influence of each of the users disseminating the content to the remaining users.

The processor 101 may use the prediction information to select one of the users 105 for inclusion into the seed group 106, in the process element 152. Generally, the first user 105-1 selected is that user with the highest probability of influencing the remaining users in the plurality of users 105 (e.g., thus exceeding the influence threshold in the process element 103). This first user 105-1 forms the basis for selecting additional users for inclusion into the seed group 106. Thus, when a next user 105-2 is selected, the processor 101 determines if that user 105-2 exceeds the influence threshold, in the process element 153, for example, by comparing the probability of the user 105-2 influencing the remaining users 105-1 and 105-3-105-R to the probability of the user 105-1 influencing the remaining users to determine if the user 105-2 has the next highest probability of influencing the remaining users. If the user 105-2 does not exceed the threshold, then another user 105 is selected in the process element 102. Otherwise, the user 105-2 is added to the seed group 106, in the process element 104.

Once the user 105 is added to the seed group 106, the processor 101 adjusts the probabilities of the other users 105 to the user that was just added to the seed group 106, in the process element 155, to adjust the influence of the other users 105. For example, when the user 105-2 is added to the seed group 106, the probabilities of the remaining users 105-1 and 105-3-105-R are adjusted to reorder levels of influence of the remaining users 105-1 and 105-3-105-R. This process may allow a next most influential user 105 to "rise up" from the plurality of the users 105 and be selected in the process element 152. Thus, if the seed group 106 is not full (e.g. based on some predetermined size), in the process element 156, then the processor 101 selects another of the users 105, in the process element 152. Otherwise, the seed group 106 selection is complete and the processor 101 exits, in the process element 157. In this regard, the processor 101 may provide the seed group 106 information to the content provider 104 to target the seed group 106 with the content.

Figure 3:
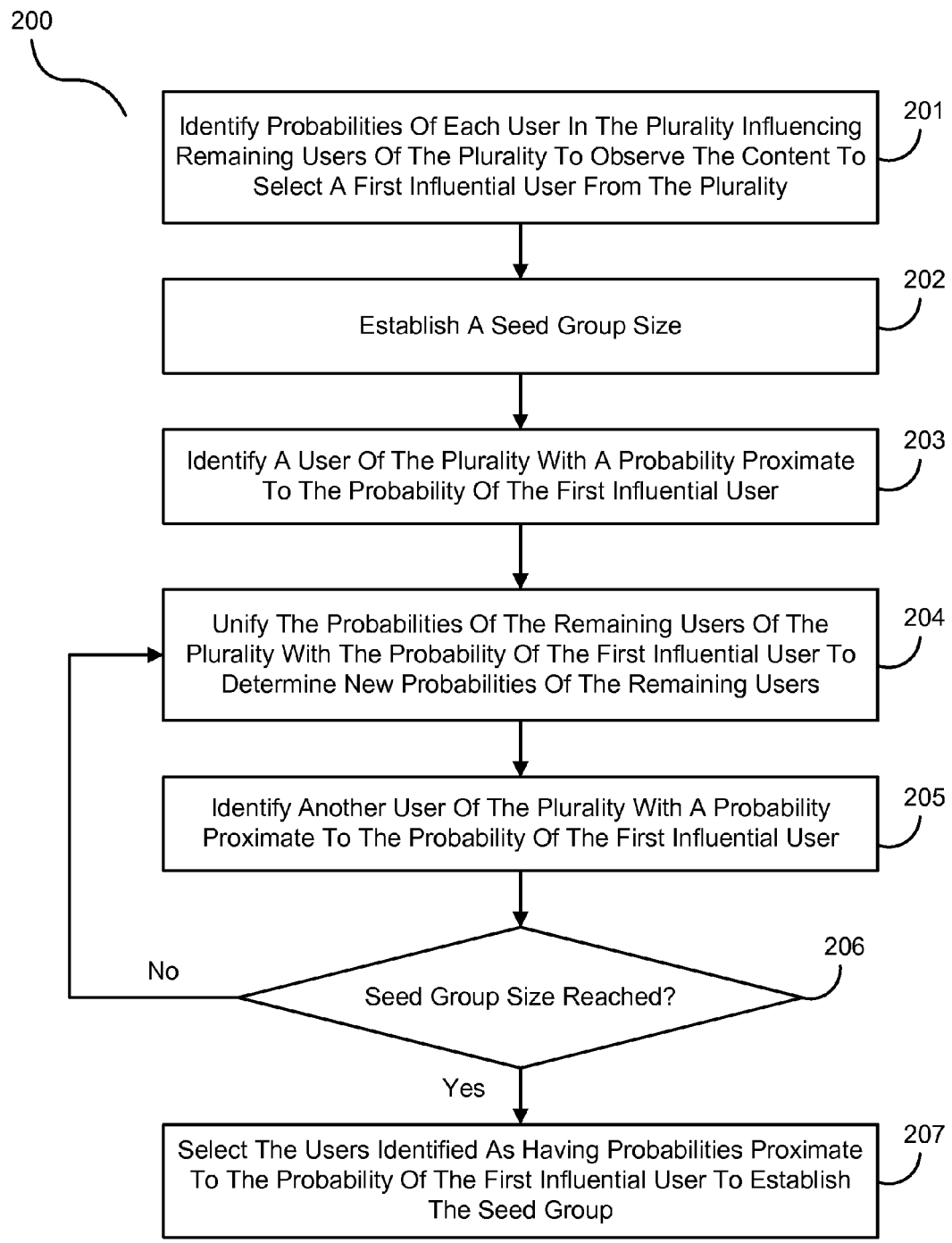
FIG. 3 is a flowchart of another exemplary process of the system of FIG. 1.
Figure 4:
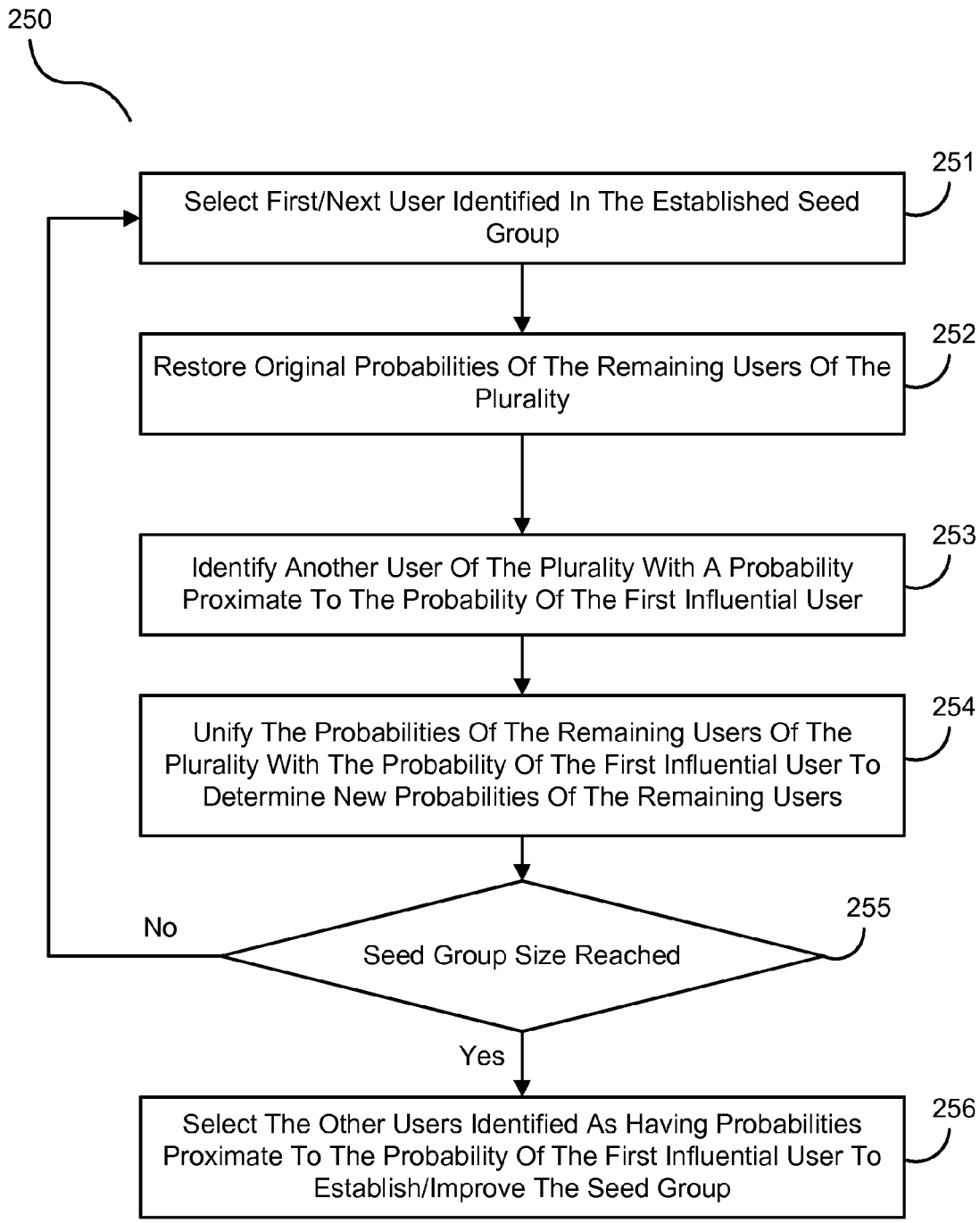
FIG. 4 is a flowchart of another exemplary process of the system of FIG. 1.

FIGS. 3 and 4 are flowcharts of other embodied processes that may be operable with the content dissemination system 100 of FIG. 1. More specifically, FIG. 3 is a flowchart of a process 200 that may be operable to perform the initial seed group 106 selection, whereas FIG. 4 is a flowchart of a process 250 that may be operable to improve upon the initial seed group 106 selection.

In FIG. 3, the process 200 initiates with the processor 101 identifying probabilities of each user 105 in the plurality influencing the remaining users in the plurality to observe the content, in the process element 201. In this regard, the processor 101 selects a first influential user 105-1 from the plurality based on the identified probabilities, in the process element 202. Generally the first influential user 105-1 has the highest probability of influencing the remaining users 105 to observe the content. For example, assuming that is desired to form a seed group 106 that maximizes dissemination of the content to the users 105 through the communication network 103, that first influential user 105-1 may be deemed by the processor 101 to have the highest probability of influencing the remaining users 105 to observe the content. The processor 101 then selects that first influential user 105-1 as a basis of computations for establishing the seed group 106. The manner in which the processor 101 selects the first influential user 105-1 may be performed in a variety of ways as a matter of design choice (e.g., a Perron vector selection, eigenvector centrality, a centroid technique, etc.).

In the process element 203, the processor 101 establishes a seed group size. For example, the processor 101 may receive input regarding a certain number of the users 105 that are to be initially targeted for observing the content. The processor 101 establishes the seed group size based on this number of users 105. Then, the processor 101 identifies a first user of the plurality with a probability that is proximate to the probability of the first influential user 105-1, in the process element 203 (e.g., the next highest probability of the users 105).

Based on that seed group size, the processor 101 iteratively unifies the probabilities of the remaining users in the plurality of users 105 with a probability of the first influential user 105-1 to determine new probabilities of the remaining users, in the process element 205. For example, the processor 101 may assign the probability of the first influential user 105-1 influencing himself/herself to the remaining users 105 so as to reorder the levels of influence for the remaining users 105 (shown and described in greater detail below). The processor 101 then identifies another user of the plurality with a probability proximate to the probability of the first influential user 105-1, in the process element 206.

In the process element 207, the processor 101 determines whether the seed group size has been reached. If not, the processor 101 continues to unify the probabilities and identify other users 105 of the plurality with probabilities proximate to the probability of the first influential user 105-1, in the process elements 205 and 206. Otherwise, the processor 101 selects the users 105 identified as having the probabilities proximate to the probability of the first influential user 105-1 to establish the seed group 106, in the process element 208.

Example

Assume there are 1000 members in a group and a relationship/influence matrix P. The processor 101 forms a seed group of 10 of those members whose combined value (e.g., probability of influence) is more than any other team of 10 members in the group. Previously, the best member of the seed group (i.e., the one with the highest "combined" probability of influencing other members), the second best member of the seed group, the third best member of the seed group, and so on, would have been selected via an incremental selection algorithm to form the seed group (e.g., application of a Perron Vector technique or a centroid technique to the given matrix P to provide a selection of a best seed member in the matrix). Thus, if "1" represented the most influential member of the larger group, a second most influential member would have traditionally been selected for which joint influence of members {1,2}, {1,3}, . . . or {1,1000} is largest. Using these selected members, a number of influential members would have been computed by comparing the values of the members as follows: {1,2}-{1}, {1,3}-{1}, . . . {1,1000}-{1}. Afterwards, a member value of "x" (i.e., a diminishing probability of influence) would have been selected and then compared to the values in a next round computations as follows: {1,x,2}-{1,x}, {1,x,3}-{1, x}, . . . {1,x,100}-{1,x}. This process would have continued throughout remaining rounds, requiring a great deal of processing resources to compute because it has an "n-squared" level of computational complexity. Thus, when larger member populations are used, the time taken for the algorithm to complete increases exponentially.

The processor 101 avoids the computational complexity of using a diminishing probability of influence by empowering non selected members iteratively with the strengths, or "powers of influence", of all selected members in the seed group. In doing so the processor 101 selects the best member "i" of the probability matrix P and then selects the $i^{th}$ member of the probability matrix P to replace the $i^{th}$ column with all "1s". Thus, the influence of every member to the $i^{th}$ member is 100% ensuring every other non-selected member has additional strengths of all selected members in the seed group. The processor 101 then again selects the best member from the new probability matrix P and repeats the best member selection and replaces them until K members are available in the seed group (i.e., a predetermined number).

In another embodiment, the system 100 is operable to refine or improve the seed group selection with a reverse iterative process similar to that of FIG. 3. For example, since the first selected member of the seed group generally receives an undeserved advantage while the others continue to prove their incremental values, the processor 101 removes the first member and replaces its column with the original member values to determine the best members. The processor 101 performs these steps for k times iteratively (e.g., the predetermined size of the seed group 106). FIG. 4 is a flowchart of another exemplary process 250 that may be operable with the system of FIG. 1 to improve the seed group selection.

The process 250 in FIG. 4 initiates by selecting the first user 105 identified in the established seed group 106 as having the probability proximate to the first influential user 105-1, in the process element 251 (e.g., the first user selected to form the seed group established by the process 200 of FIG. 3). Once that user 105 has been selected, the processor 101 restores the original probabilities of the remaining users of the plurality, in the process element 252, essentially "deunifying" the probabilities with the first influential user 105-1. The processor 101 then identifies another user 105 of the plurality with a probability that is proximate to the probability of the first influential user 105-1, in the process element 253, and unifies the probabilities of the remaining users 105 of the plurality with the probability of the first influential user 105-1 to determine new probabilities of the remaining users 105, in the process element 254. The processor 101 iteratively performs this reverse "deunification" of probabilities until the seed group size (or some other predetermined size) is reached, in the process element 255. Thus, if the seed group size is not reached, the processor 101 returns to the process element 251 to select the next user identified in the established seed group 106. Otherwise, the processor 101 selects the other users that have been identified as having probabilities proximate to the probability of the first influential user 105-1 to establish the improved seed group 106, in the process element 256.

A more simplified explanation of the processes described in FIGS. 3 and 4 is now illustrated in FIGS. 5-14. FIG. 5 illustrates a probability matrix P of five users 105 and their associated probabilities of influence over one another. A total of five users 105 has been selected for this example to provide the reader with an easier understanding of the seed group 106 selection/improvement. From there, the following FIGS. 6-14 illustrate how the seed group 106 is selected and improved from the five users 105-1-105-5. The probabilities of the five users 105 in this "influence matrix P" are formatted row wise as an $i^{th}$ user probability of influencing other users 105 within the group of five users 105-1 to 105-5, and column wise as a $j^{th}$ user probability of being influenced by the other users 105. In this regard, the user 105-1 has the highest probability of influence over the other users 105 in the group of five. The user 105-1's probability of influencing itself is "1" as is every user 105, thus the diagonal of "1s" in the matrix P. The probability $p_{21}$ is a probability that a user 105-2 will influence the user 105-1 and the probability $p_{12}$ is a probability that the user 105-1 will influence the user 105-2. The probability $p_{31}$ is a probability that the user 105-3 will influence the user 105-1, the probability $p_{32}$ is a probability that the user 105-3 will influence the user 105-2, the probability $p_{23}$ is a probability that the user 105-3 will be influenced by the user 105-2, and the probability $p_{13}$ is a probability that the user 105-3 will be influenced by the user 105-1. Similar notations are shown for the users 105-4 and 105-5 in the matrix P (e.g., $p_{42}$, $p_{43}$, $p_{53}$, $p_{35}$, etc.).

In this example, the seed group is initially formed from two of the five users 105. Generally, this process is initiated by selecting the next most influential member within the group of the five users 105. In this example, the processor 101 determines that the user 105-3 is the second most influential of the group of five users 105-1 to 105-5. The processor 101 then identifies the column for the user 105-3 with its probabilities of being influenced by the other users 105 as shown in FIG. 6 (e.g., via some selection process such as that used to select the user 105-1). The processor 101 then assigns the probability of the first user 105-1 influencing itself to the identified column for the user 105-3, as shown in FIG. 7. Thus, the processor 101 "unifies" the probability of the user 105-3 being influenced with the probability of the user 105-1 influencing itself, the user 105-2 influencing itself, the user 105-3 influencing itself, etc.

Figure 10:
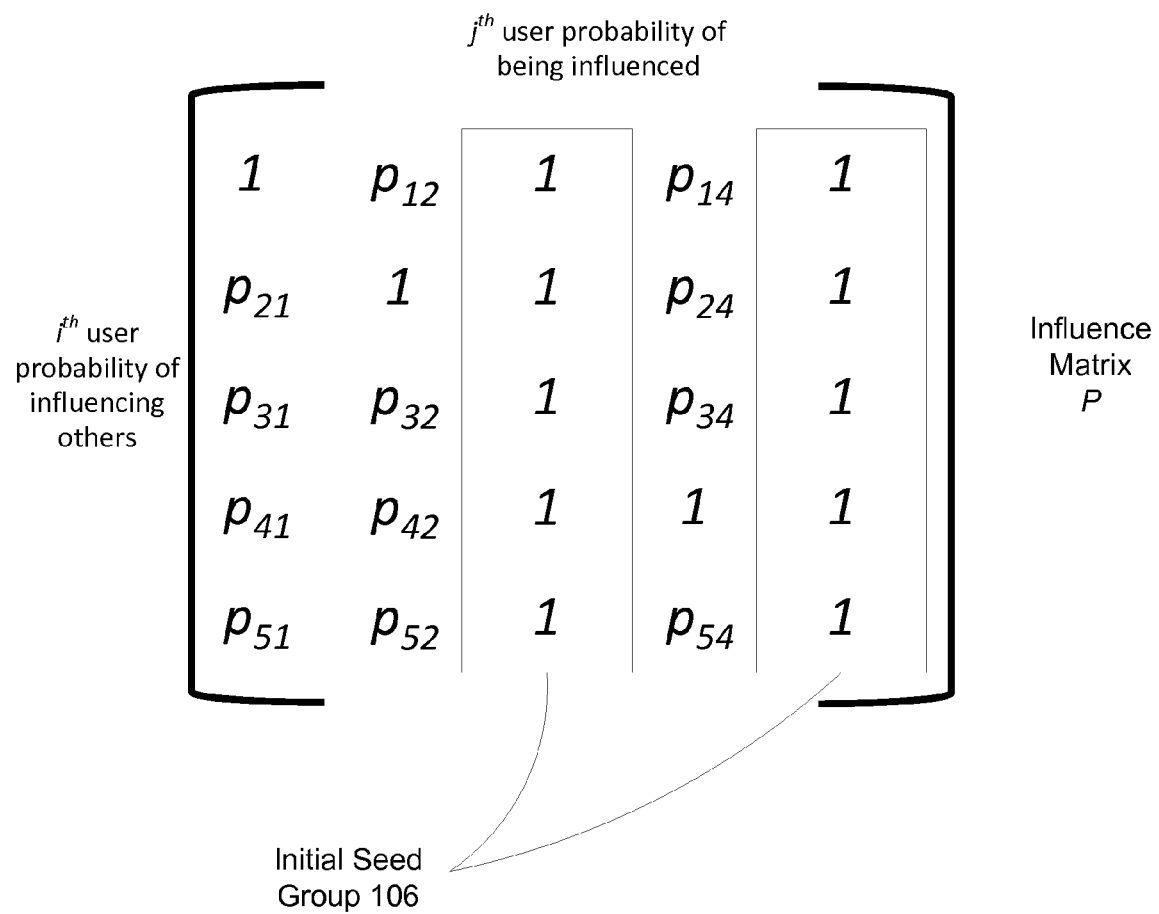

In a next step as illustrated in FIG. 8, the processor 101 identifies the next most influential user 105 in the group of five users 105. In this example, the processor identifies the user 105-5 as being the most influential next to the user 105-3 and locates its corresponding column of probabilities of being influenced by others in the group. The processor 101 then unifies probabilities of the user 105-5 being influenced by others as shown in FIG. 9 (e.g., as was done previously with the user 105-3). The processor 101 in this regard has initially identified the seed group 106 comprising the users 105-3 in 105-5 as shown in FIG. 10.

From this point, the processor 101 may begin an improvement process that iteratively removes users from and adds users to the seed group 106 to identify the best seed group 106 for content dissemination. In doing so, the processor 101 identifies the first selected user 105 to represent the initial seed group 106 (in this instance the user 105-3) and replaces its column of "1s" with its original probabilities of being influenced by others within the group of users 105, as shown in FIG. 11. Then, the processor 101 identifies the user 105 that is next most influential to the user 105-5 based on this new influence matrix P, in this instance the user 105-4 as shown in FIG. 12.

Figure 13:
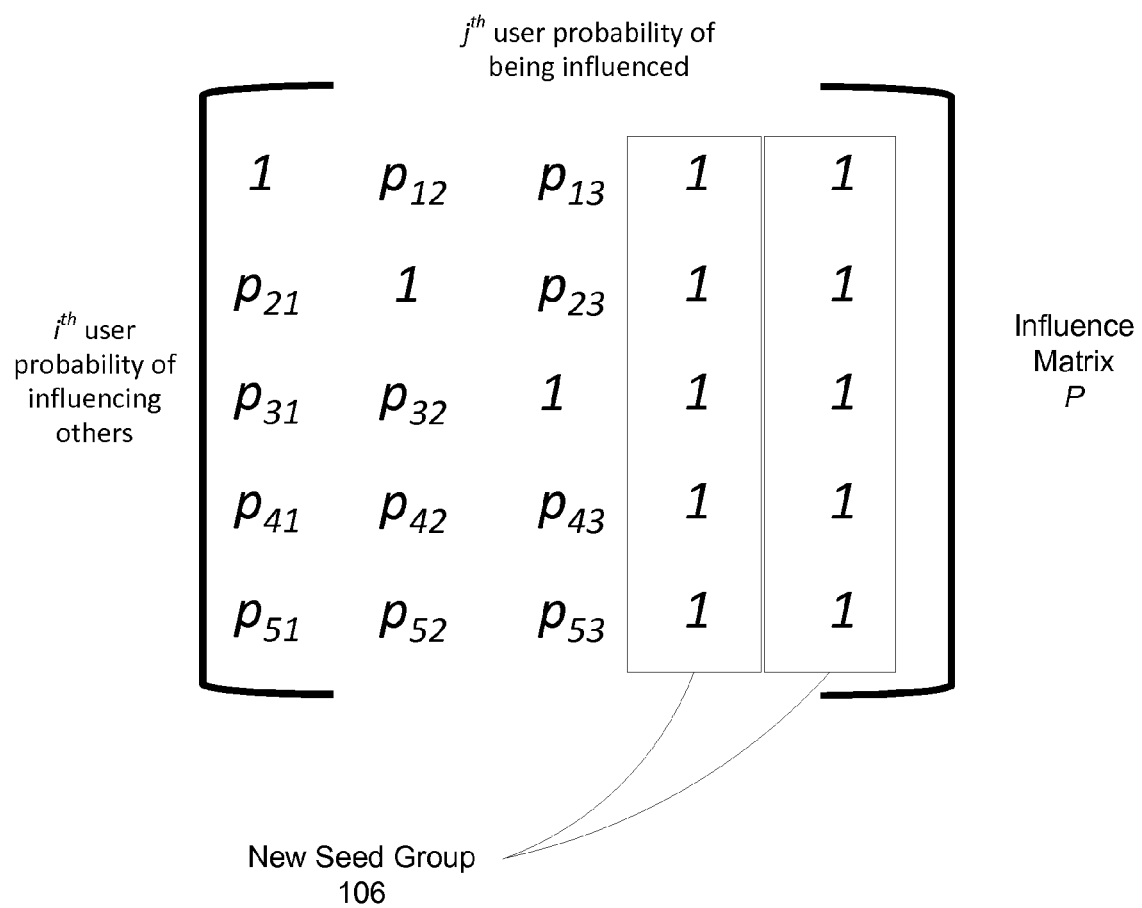

The processor 101 then replaces the column of the user 105-4 with "1s" as was done previously with the users 105-3 in 105-5 to form a new influence matrix P and a new seed group 106 comprising users 105-4 and 105-5, as shown in FIG. 13. Then, the processor 101 operates on the column of the user 105-5 by replacing its "1s" with its original probabilities as was done previously with the user 105-3 to generate a new influence matrix P, as illustrated in FIG. 14.

With each newly generated probability matrix P, the most influential user 105 next to the user 105-1 is identified from the generated probability matrix P. This process continues for each user 105 in the group of the five users 105 until the desired number of probability matrices P have been generated (e.g., until the desired number of iterations is performed based on the desired group size or some other predetermined number).

From a more mathematical perspective and without particular reference to the drawings, assume the processor 101 were to select a single user from the plurality of users, $i_0$ would then be designated as the top seed user and $X_1$ would represent the number of users 105 directly influenced by $i_0$. Similarly, $X_2$ would be the number of users 105 indirectly influenced in a second degree by $i_0$ through the seed group of users $j \neq i_0$. $X_3$ would be the number of users 105 influenced at a third degree, and so on. The processor 101 can compute the expected values of $E(X_r)$ for r=1, 2, ... for a given influence matrix P (i.e., a probability matrix). The top seed user 105-1 is the user with largest value of $\Sigma_r E(X_r)$.

If $A_{ij}^r$ is an event where a $j^{th}$ user is influenced by a seed user i at an $r^{th}$ degree, then the processor 101 for a seed user i (i.e., a component of the influence matrix P=(Pij)) computes $\Sigma_j \Sigma_r P(A_{ij}^r)$ and then determines i where the sum is maximum. Even if the model is an independent model (e.g., where all influence attempts are independent) $P_{ij}$ can be algebraically complex. If $P^{(degree\_r)}$ represents probabilities of the $i^{th}$ user influencing a $j^{th}$ user at the $r^{th}$ degree, then $Q = \Sigma_{r=1}^{\infty} P^{(degree\_r)}$.

With this in mind, if S is a seed vector with "1s" and "0s", 1 being a vector of "1s" and P being the influence matrix, then the processor 101 can approximate the influences of the seed vector S as Total Influence=$f(Q, S)$=S'Q1. Thus, $p_{ij}^{(degree\_2)}$ is a probability that the $j^{th}$ user getting influenced by i at a secondary degree of computed predictions is $\Sigma_i p_{il}^{(degree\_2)} p_{lj}(1-p_{ij}^{(degree\_2)})$. Similarly, at a third degree/round of computed predictions, $p_{ij}^{(degree\_3)} = \Sigma_l p_{il} p_{lj}(1-p_{ij})(1-p_{lj})$, and so on. Then, in the influence matrix P, the $p_{ij}$'s are relatively small and $p_{ii}=1$ for all i. And if $p_{ij}^k$ is an element of natural multiplication derived from the matrix $P^k$, then the processor 101 may compute $$p_{ij}^{(degree\_2)} = p_{ij} + \sum_{i \neq j} p_{il} p_{lj} \geq p_{ij} + p_{ij}^{(degree\_2)} \geq p_{ij}.$$

Similarly, the processor 101 may compute the probability of I influencing j at degree r. Given this, the influence matrix P can be replaced by $P^k$ for some large k value for the processor 101 to calculate. From there, the processor 101 may determine a top seed selection of users 105.

For example, if z is a Perron vector of the influence matrix P and if $z_{i_0}$ is a maximum coordinate of z, then $i_0$ is a seed vector that maximizes $s'P^{k'}1$ for a large k' value and thus provides the processor 101 with the ability to determine the top seed selection. More specifically, if A is a square matrix of positive entries, then it has a real and positive eigenvalue $\rho(A)$ that is also positive and exceeds any other eigenvalue. It also has a positive eigenvector that is unique up to a scalar multiple. Thus, there exists x>0 such that $Ax=\rho(A)x$. If $$B = \frac{1}{\rho(A)},$$

then $B^k$ converges to a matrix of columns proportional to x as part of the Perron-Frobenius theory. These results hold when A has zeros but is irreducible meaning that for any ij, $p_{ij}^k > 0$ for some k value.

The processor 101 may assume that the $p_{ij}$ values are small (e.g., less than 5%). Accordingly, $p_{ij}^{(degree\_2)}$ may be approximated by $\Sigma_l p_{il} p_{lj}$ during the higher-order terms. Then, $\Sigma_{k=1}{}^r P^{(k)} = P^{(r)}$. If $\rho(P)$ is a Perron eigenvalue of P within an eigenvector maximum component, then the processor 101 may deem i to be the most influential user.

From there, the processor 101 may deem the initial seed vector as a probability vector s of all zeros with a single "1" assuming a single user as the seed. Then, for a fixed k value, $s'P^k 1$ is the expected number of influenced users after k degrees/rounds of computed predictions. Then, the processor 101 maximizes (or attempts to maximize) $s'P^k 1$ over all seed vectors s where k is fixed and relatively large (i.e., an integer much greater than 1). The largest component of the vector $P^k 1$ is $i_0$ if the $i_0{}^{th}$ component of the Perron vector of the influence matrix P is the largest. Accordingly, the processor 101 deems z to be the Perron vector of the influence matrix P, satisfying Pz=rz. If $z_{i_0}$ is the maximum coordinate of the Perron vector z, the processor 101 determines the seed vector $s_0$ (having a "1" at the position $i_0$ and zeros elsewhere) that solves maximization and provides the top seed selection.

With the top seed user 105-1 selected, the processor 101 may perform incremental comparisons by adding a new user 105 and incrementally building the seed group 106 of K seeds. In doing so, the processor 101 "pads" all of the competing users 105 with the same value of influence as the existing users. For example, a function $f$ is deemed submodular, if $S \subset T$ and if $f(S \cup x) - f(S) \geq f(T \cup x) - f(T)$. Assuming that G is a graph having N users, P is again the influence matrix, and A is a subset of the users 105, then the processor 101 determines that the spread(A) (a Lebesgue measure) is an expected number of influences via A users 105. From there, the processor 101 can determine a spread function that gives the expected value of the spread for a given subset and is therefore submodular.

Then, if $S \subset T$ and A is any other subset, then $A \cap S \subset A \cap T$. Accordingly, $$S \cup A = S + S^c A = S + S^c TA + S^c T^c A$$

Since $S \subset T$ $$S \cup A - S = S^c TA + T^c A = S^c TA + (T \cup A - T).$$

The processor 101 is, therefore, operable to determine results of the spread by taking expectations on both sides for the spread by the users 105. And, any process that maximizes incremental addition to the seed group 106 by maximizing incremental spread is at least $$100\left(1 - \frac{1}{e}\right)$$

percent of the overall best K group size. Thus, this above process is more efficient than previous attempts while also providing a more optimal incremental seed group 106 formation method when given a method M of selecting a top seed user 105.

To form the seed group 106, the processor 101 performs an iterative method of K node selection of the users 105 using a stepwise top seed selection process by iteratively re-computing the matrix P. For example, as part of a first step, assume that $j_0$ is a top seed user selected by a method M. Then, in the matrix $P = ((p_{ij}))$, the processor 101 replaces $p_{ij_0}$ with 1 for all i. Thus, if any one of the i users is selected as an influencer for the new matrix P, then the processor 101 deems that user 105 as having influencing powers of $i_0$ for subsequent rounds so long as the user 105 has an influencing power of $i_0$ with a probability of "1". After the processor 101 selects two or more seed users 105, the processor 101 replaces their respective column elements with "1s" and selects a top seed user 105 for the recomputed matrix P as part of a second step. Then, the processor 101 performs the first and second steps until there are k seeds. This "k-seeds" group selection process is fundamentally different than merely selecting top k ranked seeds because it seeks to determine the combined strength of the seed group 106 as opposed to an individual and therefore decreases the computational complexity for the processor 101.

Afterwards, the processor 101 may determine the "best incremental selection" (BIS) if there exists a method $M_{BIS}$ to select a best seed user 105-1. For example, if k seeds $j_0, j_1, \ldots, j_k$ are preselected in the matrix P, then in a new matrix $P' = ((p_{ij}))$ where $p_{ij_l} = 1$ for all $j_0, j_1, \ldots, j_k$ and the processor 101 computes the best seed for this matrix, the processor 101 may be operable to determine a net maximum incremental influencer to the seed group 106.

By decreasing the existing seed group 106 by one user 105-R at a time, a "best incremental replacement" (BIR) method $M_{BIR}$ may be used to select a best seed group 106, in a first-in first-out manner. For example, if k seeds $j_0, j_1, \ldots, j_k$ are preselected in the matrix P, then in a new matrix $P' = ((p_{ij}))$ where $p_{ij_l}$ is replaced by the original values for one of the seeds $j_0, j_1, \ldots, j_k$ the processor 101, in a first-in first-out manner, then computes the best incremental seed for this matrix for replacement. The processor 101 may then remove and replace certain users 105 from the seed group 106. This method generally yields a best incremental seed group 106 formation for any given method $M_{bis}$ Under certain conditions, recursive formation of the seed group 106 may be optimal. In this regard, the processor 101 may determine user selection such that the first user 105-1 has the most dominating position and the last user 105-K selected has the least dominating position in the larger group of users 105 (e.g., where "K" generally represents an integer much greater than 1, the overall size/number of the plurality of users 105). In this regard, the processor 101 may initiate with a seed group size of zero and form a seed group 106 based on the above best incremental selection method until the seed group 106 reaches a size K (e.g., the predetermined size of the seed group 106). Then, the processor 101 may perform an improvement round, where each seed is possibly replaced starting with the contributing user 105 via the method $M_{BUE}$ and add a user 105 via the method $M_{BIS}$ to form a group of size K−1. The processor 101 may iteratively perform these steps for K degrees/rounds and thus project the users 105 influencing one another.

Figure 15:
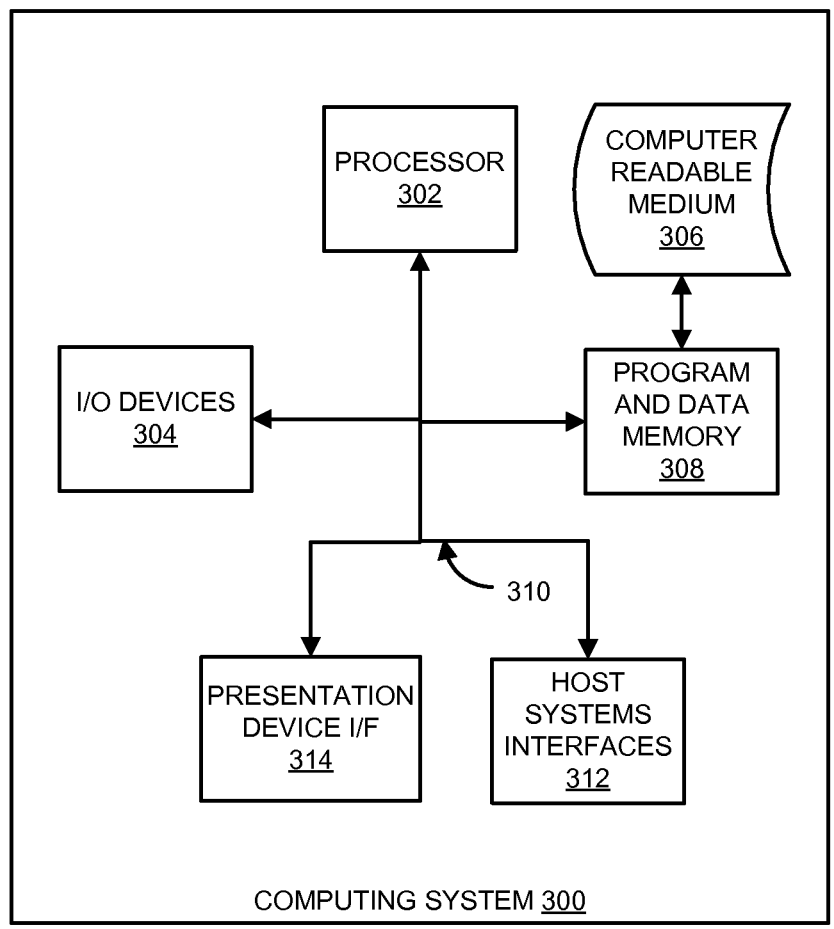
FIG. 15 illustrates a computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 15 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computing system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

Although shown and described with respect to increasing the dissemination of content across a communication network, the invention is not intended to be so limited. Rather the probabilistic concepts described herein can be implemented in other ways. For example, the processor 101 may apply the seed group generation processes above to data networks to determine data traffic congestion at network nodes. The processor 101 may also use the processes to determine dissemination of content among personal networks. For example, a person may notice a traffic accident and notify others of the accident so that they will avoid it. The processor 101 may be operable to identify a number of people who may be most influential in getting a message out to avoid the traffic accident. In yet another example, the processor 101 may be used to determine which counties are to be targeted for a campaign among thousands of counties. For example, in politics, a politician may develop an advertising campaign directed to counties that are identified as being politically aligned with the politician. The politician may therefore seek to achieve the greatest spread of a political message by introducing the message to a seed group of those counties. In another example, the processor 101 could be used to select a number of beta customers who would need to be pleased with a product for a successful launch campaign among millions of potential customers. Accordingly, the invention is not intended to be limited to users for any particular communication network.

What is claimed is:

1. A method of determining a seed group from a plurality of users, wherein the seed group is determined for disseminating content across a communication network connecting the users, the method comprising:
executing a content dissemination program on a processor of a computing device to perform:
obtaining, from database storage, probabilities of the plurality of users influencing one another to observe the content;
predicting an influence measure of each of the plurality of users disseminating the content to other users of the plurality of users, the predicting using the obtained probabilities;
selecting users from the plurality of users until the seed group includes a predetermined number of the users, including iteratively:
adding a selected user to the seed group if the influence measure of the selected user exceeds a threshold;
if the selected user is added to the seed group, adjusting probabilities of the other users of the plurality of users influencing the selected user, including replacing probabilities of the other users to influence the selected user with a probability of self-influence associated with the selected user; and
updating the influence measure of each of the plurality of users disseminating the content to the other users of the plurality of users using the adjusted probabilities; and
communicating the content to the users of the seed group for dissemination to the plurality of users.

2. The method of claim 1, further comprising:
for the predetermined number of users and starting with a first user added to the seed group, iteratively:
removing the first user from the seed group;
changing the adjusted probabilities of the other users influencing the first user with corresponding original probabilities obtained from the database storage;
updating influence measures of the plurality of users using the changed probabilities; and
adding another user to the seed group if the influence measure of said another user exceeds the threshold.

3. The method of claim 1, wherein the communication network is a network operable to probabilistically propagate the content based on the seed group, the network selected from a group consisting of: the Internet; a television network; a radio network; an interpersonal communication network; and a data network.

4. The method of claim 1, further comprising:
identifying a first user of the plurality of users as having a highest level of predicted influence measure of disseminating the content to the other users of the plurality of users as a basis for selecting the users from the plurality of users to add to the seed group.

5. The method of claim 4, wherein:
identifying the first user further comprises applying a Perron vector to the plurality of users to determine the highest level of predicted influence measure among the plurality of users.

6. The method of claim 1, wherein:
adding the selected user to the seed group further comprises comparing a user previously added to the seed group to another user of the plurality of the users to determine a next highest level of influence measure of said another user as the threshold.

7. A content dissemination system comprising:
a database storing probabilities of a plurality of users to influence one another to observe content disseminated across a communication network that connects the users;

one or more processors; and
a memory having instructions stored thereon that are executable by the one or more processors to determine a seed group from the plurality of users by performing operations comprising:
obtaining, from the database, the probabilities of the plurality of users influencing one another;
predicting an influence measure of each of the plurality of users disseminating the content to other users of the plurality of users, the predicting using the obtained probabilities;
selecting users from the plurality of users until the seed group includes a predetermined number of the users, including iteratively:
adding a selected user to the seed group if the influence measure of the selected user exceeds a threshold;
if the selected user is added to the seed group, adjusting the probabilities of the other users of the plurality of users influencing the selected user, including replacing probabilities of the other users to influence the selected user with a probability of self-influence associated with the selected user; and
updating the influence measure of each of the plurality of users disseminating the content to the other users of the plurality of users using the adjusted probabilities; and
communicating the content to the users of the seed group for dissemination to the plurality of users.

8. The system of claim 7, wherein the operations further comprise:
for the predetermined number of users and starting with a first user added to the seed group, iteratively:
removing the first user from the seed group;
changing the adjusted probabilities of the other users influencing the first user with corresponding original probabilities obtained from the database storage;
updating influence measures of the plurality of users using the changed probabilities; and
adding another user to the seed group if the influence measure of said another user exceeds the threshold.

9. The system of claim 7, wherein the communication network is a network operable to probabilistically propagate the content based on the seed group, the network selected from a group consisting of: the Internet; a television network; a radio network; an interpersonal communication network; and a data network.

10. The system of claim 7, wherein the operations further comprise:
identifying a first user of the plurality of users as having a highest level of predicted influence measure of disseminating the content to the other users of the plurality of users as a basis for selecting the users from the plurality of users to add to the seed group.

11. The system of claim 10, wherein:
identifying the first user includes applying a Perron vector to the plurality of users to determine the highest level of predicted influence measure among the plurality of users.

12. The system of claim 7, wherein the operations further comprise:
adding the selected user to the seed group by comparing a user previously added to the seed group to another user of the plurality of the users to determine a next highest level of influence measure of said another user as the threshold.

13. A method of determining a seed group from a plurality of users, wherein the seed group is determined for disseminating content across a communication network connecting the users, the method comprising:
executing a content dissemination program on a processor of a computing device to perform:
obtaining, from database storage, probabilities of the plurality of users influencing one another to observe the content;
predicting an influence measure of each of the plurality of users in influencing the other users of the plurality of users using the obtained probabilities;
establishing a seed group by selecting users from the plurality of users based on an influence measure of a first influential user from the plurality of users, including for a predetermined number of times successively:
identifying an unselected user in the plurality of users, having an influence measure that is proximate to the influence measure of the first influential user;
adding the identified user to the seed group; and
unifying the probability of the identified user being influenced by other users with the probability of the first influential user influencing itself; and
updating the influence measure of remaining unselected users in the plurality of users; and
communicating the content to the users of the seed group for dissemination to the plurality of users.

14. The method of claim 13, further comprising:
for the predetermined number of times, iteratively:
selecting one of the selected users from the established seed group for removal from the seed group;
changing the probabilities of other users influencing the user selected for removal with corresponding original probabilities obtained from the database storage;
updating the influence measure of the remaining unselected users in the plurality of users;
identifying a different unselected user in the plurality of users, having an influence measure that is proximate to the influence measure of the first influential user; and
adding the identified different unselected user to the seed group.

15. The method of claim 13, wherein:
the influence measure of a user added to the seed group is closest to the influence measure of the first influential user, compared to the influence measure of the other unselected users.

16. The method of claim 13, further comprising:
establishing a seed group size to establish the predetermined number of times.

17. The method of claim 13, wherein:
the first influential user is selected by applying a Perron vector to the plurality of users to determine the highest level of predicted influence measure among the plurality of users.

18. The method of claim 13, further comprising:
selecting the first influential user from the plurality of users based on the predicted influence measures.

19. The method of claim 13, wherein:
the first influential user has a highest probability of influencing the remaining unselected users in the plurality of users to observe the content.

20. The method of claim 13, wherein:
the communication network is a network operable to probabilistically propagate the content based on the seed group, the network selected from a group consisting of: the Internet; a television network; a radio network; an interpersonal communication network; and a data network.

* * * * *